United States Patent
Wehmeier

(10) Patent No.: US 11,208,950 B2
(45) Date of Patent: Dec. 28, 2021

(54) GAS TURBINE ENGINE WITH COMPRESSOR INLET GUIDE VANE POSITIONED FOR STARTING

(71) Applicant: United Technologies Corporation, Hartford, CT (US)

(72) Inventor: Eric J. Wehmeier, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 974 days.

(21) Appl. No.: 14/259,180

(22) Filed: Apr. 23, 2014

(65) Prior Publication Data

US 2014/0223916 A1    Aug. 14, 2014

Related U.S. Application Data

(63) Continuation of application No. 13/367,742, filed on Feb. 7, 2012, now abandoned.
(Continued)

(51) Int. Cl.
*F02C 9/20*  (2006.01)
*F02C 3/13*  (2006.01)
(Continued)

(52) U.S. Cl.
CPC ............... *F02C 3/13* (2013.01); *F01D 19/00* (2013.01); *F02C 7/262* (2013.01); *F02C 9/20* (2013.01);
(Continued)

(58) Field of Classification Search
CPC .... F02C 7/262; F02C 9/20; F02C 7/26; F02C 7/268; F02C 7/275
See application file for complete search history.

(56) References Cited

U.S. PATENT DOCUMENTS 3,287,906 A    11/1966    McCormick
3,754,484 A    8/1973    Roberts
(Continued)

FOREIGN PATENT DOCUMENTS

EP    0459816 A1    12/1991
GB    1516041    6/1978
(Continued)

OTHER PUBLICATIONS

Rauch Design Study of an Air Pump and Integral Lift Engine ALF 504 using the Lycoming 502 Core (Year: 1972).*
(Continued)

*Primary Examiner* — Gerald L Sung
(74) *Attorney, Agent, or Firm* — Carlson, Gaskey & Olds, P.C.

(57) ABSTRACT

A gas turbine engine includes a compressor section, the compressor section including a variable inlet guide vane which is movable between distinct angles to control the airflow approaching the compressor section. A control is programmed to position the vane at startup of the engine to direct airflow across the compressor section. The engine includes a fan for delivering bypass air into a bypass duct positioned outwardly of a core engine including the compressor section. The position of the vane is configured to direct airflow across the compressor section while an aircraft associated with the gas turbine engine is in the air, and to increase a windmilling speed of the compressor section and the turbine rotors. A method and variable inlet vane are also disclosed.

13 Claims, 3 Drawing Sheets

Related U.S. Application Data

(60) Provisional application No. 61/592,667, filed on Jan. 31, 2012.

(51) Int. Cl.

| | | |
|---|---|---|
| F02C 7/262 | (2006.01) | |
| F02K 3/06 | (2006.01) | |
| F02K 1/12 | (2006.01) | |
| F02K 3/075 | (2006.01) | |
| F01D 19/00 | (2006.01) | |

(52) U.S. Cl.
CPC .............. *F02K 1/1207* (2013.01); *F02K 3/06* (2013.01); *F02K 3/075* (2013.01); *F05D 2260/85* (2013.01); *F05D 2270/092* (2013.01)

(56) References Cited

U.S. PATENT DOCUMENTS

| | | | |
|---|---|---|---|
| 3,892,358 | A | 7/1975 | Gisslen |
| 4,069,661 | A | 1/1978 | Rundell et al. |
| 4,130,872 | A | 12/1978 | Harloff |
| 4,251,987 | A | 2/1981 | Adamson |
| 5,107,674 | A | 4/1992 | Wibbelsman et al. |
| 5,349,814 | A | 9/1994 | Ciokajlo et al. |
| 5,433,674 | A | 7/1995 | Sheridan et al. |
| 5,447,411 | A | 9/1995 | Curley et al. |
| 5,524,847 | A | 6/1996 | Brodell et al. |
| 5,694,765 | A | 12/1997 | Hield et al. |
| 5,778,659 | A | 7/1998 | Duesler et al. |
| 5,845,483 | A | 12/1998 | Petrowicz |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,814,541 | B2 | 11/2004 | Evans et al. |
| 7,021,042 | B2 | 4/2006 | Law |
| 7,591,754 | B2 | 9/2009 | Duong et al. |
| 7,694,505 | B2 | 4/2010 | Schilling |
| 7,758,298 | B2 * | 7/2010 | Micheli ................. F01D 17/162 415/1 |
| 7,824,305 | B2 | 11/2010 | Duong et al. |
| 7,926,260 | B2 | 4/2011 | Sheridan et al. |
| 7,997,085 | B2 | 8/2011 | Moniz et al. |
| 8,205,432 | B2 | 6/2012 | Sheridan |
| 2006/0242962 | A1 * | 11/2006 | Johnson .................. F01D 15/10 60/761 |
| 2007/0240426 | A1 | 10/2007 | Wiegman et al. |
| 2007/0253805 | A1 | 11/2007 | Micheli |
| 2008/0072568 | A1 | 3/2008 | Moniz et al. |
| 2009/0053058 | A1 | 2/2009 | Kohlenberg |
| 2009/0097967 | A1 * | 4/2009 | Smith .................. F01D 17/162 415/145 |
| 2009/0235638 | A1 * | 9/2009 | Jain ....................... F02K 1/1207 60/204 |
| 2010/0148396 | A1 | 6/2010 | Xie et al. |
| 2010/0331139 | A1 | 12/2010 | McCune |
| 2011/0176913 | A1 | 7/2011 | Wassynger et al. |
| 2018/0128182 | A1 * | 5/2018 | Hayama ................. F02C 7/262 |
| 2019/0264615 | A1 * | 8/2019 | Husband ................ F02C 7/275 |
| 2020/0283138 | A1 * | 9/2020 | Mohammed .......... B64C 27/325 |

FOREIGN PATENT DOCUMENTS

| | | |
|---|---|---|
| GB | 2038947 A | 7/1980 |
| GB | 2041090 | 9/1980 |
| WO | 2007038674 | 4/2007 |
| WO | 2011038213 A1 | 3/2011 |

OTHER PUBLICATIONS

International Preliminary Report on Patentability for International Application No. PCT/US2013/021799 dated Aug. 14, 2014.
Supplementary European Search Report for European Patent Application No. 13775616.9 dated Sep. 24, 2015.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Jane's Aero-Engines, Issue Seven, Copyright 2000, pp. 510-512.
Singapore Search Report for Singapore Patent Application No. 11201402934Y dated Sep. 18, 2015.
McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press, p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.

(56) References Cited

OTHER PUBLICATIONS

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

\* cited by examiner

GAS TURBINE ENGINE WITH COMPRESSOR INLET GUIDE VANE POSITIONED FOR STARTING

CROSS-REFERENCE TO RELATED APPLICATION

This application is a continuation of U.S. application Ser. No. 13/367,742, filed Feb. 7, 2012, which claims priority to U.S. Provisional Application No. 61/592,667, which was filed Jan. 31, 2012.

BACKGROUND

This application relates to a gas turbine engine having an inlet guide vane which has its position controlled to increase windmilling speed of engine components.

Gas turbine engines are known, and typically include a fan delivering air into a bypass duct outwardly of a core engine, and into a compressor in the core engine. Air in the compressor is passed downstream into a combustor section where it is mixed with fuel and ignited. Products of this combustion pass downstream over turbine rotors, driving them, and in turn drive the compressor and fan. Recently it has been proposed to include a gear reduction between a low pressure compressor and the fan, such that the low pressure turbine can drive the two at distinct speeds.

A gas turbine engine as used on an aircraft must be able to start under several conditions. First, the gas turbine engine must be able to start when on the ground. A starter can be used on the ground. Second, the gas turbine engine must be able to start in the air. In the air, at lower speeds of the aircraft, the normal starter for the gas turbine engine may be utilized to begin driving the turbine/compressor rotors. However, at higher speeds the starter may not be utilized. At higher speeds so called "windmilling" is relied upon at startup. Windmilling typically occurs as the compressor and fan rotors are driven by the air being forced into the core engine, and the bypass duct, as the aircraft continues to move.

SUMMARY

A gas turbine engine according to an embodiment of the present disclosure includes a compressor section, a low spool, and a fan. The fan delivers air into the compressor section. The compressor section compresses air and delivers air into a combustion section. The compressor section includes a variable inlet guide vane which is movable between distinct angles to control the airflow approaching the compressor section, a control programmed to position the vane at startup of the engine to direct airflow across the compressor section. The fan delivers bypass air into a bypass duct positioned outwardly of a core engine includes the compressor section. The position of the vane is configured to direct airflow across the compressor section while an aircraft associated with the gas turbine engine is in the air, and to increase a windmilling speed of the compressor section and the turbine rotors.

In a further embodiment of the foregoing gas turbine engine, the compressor section includes a first compressor and a second compressor.

In a further embodiment of either of the foregoing gas turbine engines, the vane is positioned forwardly of an upstream most rotor in the first compressor.

In a further embodiment of any of the foregoing gas turbine engines, the fan is driven with the first compressor by the low spool, and there is a gear reduction between the fan and the low spool.

In a further embodiment of any of the foregoing gas turbine engines, the control includes stored desired positions for the vane to provide increased airflow into the compressor section at startup at various conditions.

In a further embodiment of any of the foregoing gas turbine engines, the various conditions include the altitude of an aircraft carrying the gas turbine engine, and an air speed of the aircraft.

In a further embodiment of any of the foregoing gas turbine engines, the conditions also include a speed of the low spool, the low spool rotating with the first compressor when startup is occurring.

In a further embodiment of any of the foregoing gas turbine engines, the bypass duct has a variable area nozzle. The position of the nozzle is controlled at startup to provide airflow through the bypass duct and across the fan to increase the windmilling speed.

In a further embodiment of any of the foregoing gas turbine engines, a bypass ratio of the volume of air passing into the bypass duct to the volume delivered into the compressor section is greater than about 6.

In a further embodiment of any of the foregoing gas turbine engines, a starter is also utilized in combination with the windmilling while the aircraft is in the air to start the engine.

A further embodiment of any of the foregoing gas turbine engines, an actuator can change the angle of the guide vane. The actuator is responsive to the control.

In a further embodiment of any of the foregoing gas turbine engines, the first compressor is upstream of the second compressor.

A further embodiment of any of the foregoing gas turbine engines, a geared architecture is configured to drive the fan at a lower speed than the low spool. The geared architecture is driven by the low spool.

In a further embodiment of any of the foregoing gas turbine engines, the geared architecture defines a gear reduction ratio greater than or equal to about 2.3.

A method of designing a gas turbine engine according to an embodiment of the present disclosure includes the steps of: configuring a compressor section to compress air and deliver it into a combustion section; configuring the combustion section to mix air with fuel, ignite the fuel, and drive the products of the combustion across turbine rotors; configuring a fan to deliver air into a core engine including the compressor section, the combustor, and the turbine rotors, and also to deliver bypass air into a bypass duct positioned outwardly of the core engine; configuring the compressor section to include a variable inlet guide vane, the vane being movable between distinct angles to control the airflow approaching the compressor section at startup of a gas turbine engine while an aircraft associated with the engine is in the air, and to increase a windmilling speed of said compressor section and the turbine rotors; and configuring a control to position the vane at startup of the engine to direct airflow across the compressor section.

A further embodiment of the foregoing method, the method includes configuring the compressor section to include a first compressor and a second compressor.

A further embodiment of either of the foregoing methods, the method includes configuring the first compressor to be arranged upstream of the second compressor.

A further embodiment of any of the foregoing methods, the method includes configuring the control to include stored desired positions for the vane to provide increased airflow into the compressor section at startup at various conditions.

In a further embodiment of any of the foregoing methods, the various conditions include the altitude of an aircraft carrying the gas turbine engine, and an air speed of the aircraft.

In a further embodiment of any of the foregoing methods, the conditions also include a speed of a low spool. The low spool is configured to rotate with the first compressor when startup is occurring.

A further embodiment of any of the foregoing methods, the method includes configuring a starter to drive the low spool and a high spool to be utilized in combination with the windmilling while the aircraft is in the air to start the engine.

A further embodiment of any of the foregoing methods, the method includes configuring the bypass duct to include a variable area nozzle. A position of the nozzle is controlled at startup to provide airflow through the bypass duct and across the fan to increase the windmilling speed.

In a further embodiment of any of the foregoing methods, a bypass ratio of the volume of air passing into the bypass duct to the volume delivered into the compressor section is greater than about 6.

A further embodiment of any of the foregoing methods, the method includes configuring a geared architecture to provide a speed reduction ratio greater than about 2.3: and configuring a fan to be driven by the turbine rotors through the geared architecture.

A further embodiment of any of the foregoing methods, the method includes configuring an actuator to change the angle of the guide vane. The actuator is responsive to the control.

DETAILED DESCRIPTION

Figure 1:
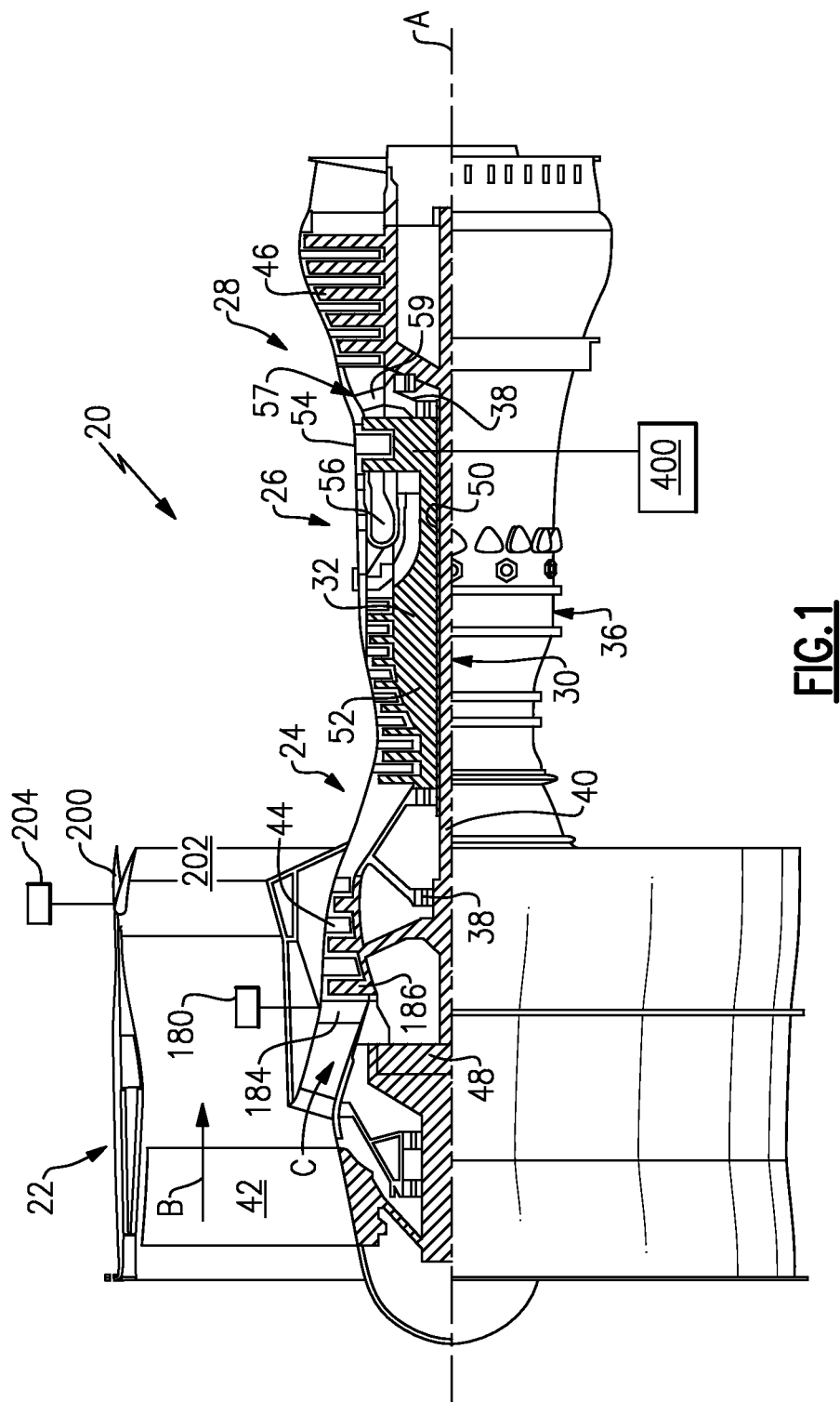
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

The gas turbine engine 20 is provided with controls and features to optimize starting.

A starter 400 is typically included with a gas turbine engine, and is relied upon to begin driving the low spool and high spool when the engine is started. This will typically occur when the airplane is on the ground, and is a relatively simple process at that time.

On the other hand, there are times when the gas turbine engine is shut down while an aircraft associated with the gas turbine engine is still in the air. At lower air speeds, the starter may be utilized while the aircraft is in the air to begin driving rotation of the low and high spool 32 to begin the restart process. Of course, once the combustion section has begun to ignite and burn the fuel, then the products of combustion will take over driving the turbine rotors and the starter may stop.

Under certain conditions, use of the starter while the aircraft is in the air is not advised or is not possible. Under those conditions, the force of air being driven into the engine core, and across the fan 42 is relied upon to drive the turbine rotors, and the compressor rotors. This process is called "windmilling."

It is desirable to increase the speed of windmilling of the high spool that occurs when it is necessary to restart the engine because higher windmill speeds drive higher airflow.

The engine is provided with equipment that is controlled to increase the ability to maximize windmilling of the high spool. Thus, an actuator 180 selectively drives a control to position a compressor inlet guide vane 184 which is just forward of the forward most low compressor rotor 186.

An angle of the vane 184 is preferably positioned to maximize the flow of air reaching the rotor 186 while the aircraft is being restarted. In flight, this would be positioning the vane 184 such that the air being forced into the core engine as the aircraft continues to move through the air with engine 20 not being powered, is maximized.

Also, the bypass airflow B may be maximized by positioning a variable fan nozzle 200. The variable fan nozzle 200 is controlled by an actuator 204, shown schematically, to move axially and control the flow area at 202. Generally, one would open the nozzle to a full open position to maximize this air flow.

Both the actuator 180 and the actuator 204 for the variable area fan nozzle 200 are generally as known. However, they have not been utilized at startup to maximize the amount of windmilling which occurs.

In general, it is desirable to position the vane 184 to maximize airflow through the core engine, and position the variable area nozzle 200 to maximize airflow across the fan 42. Airflow across the fan 42 will drive the fan to rotate, and air being forced into the core engine will cause the compressor rotor 186 to rotate.

Figure 2:
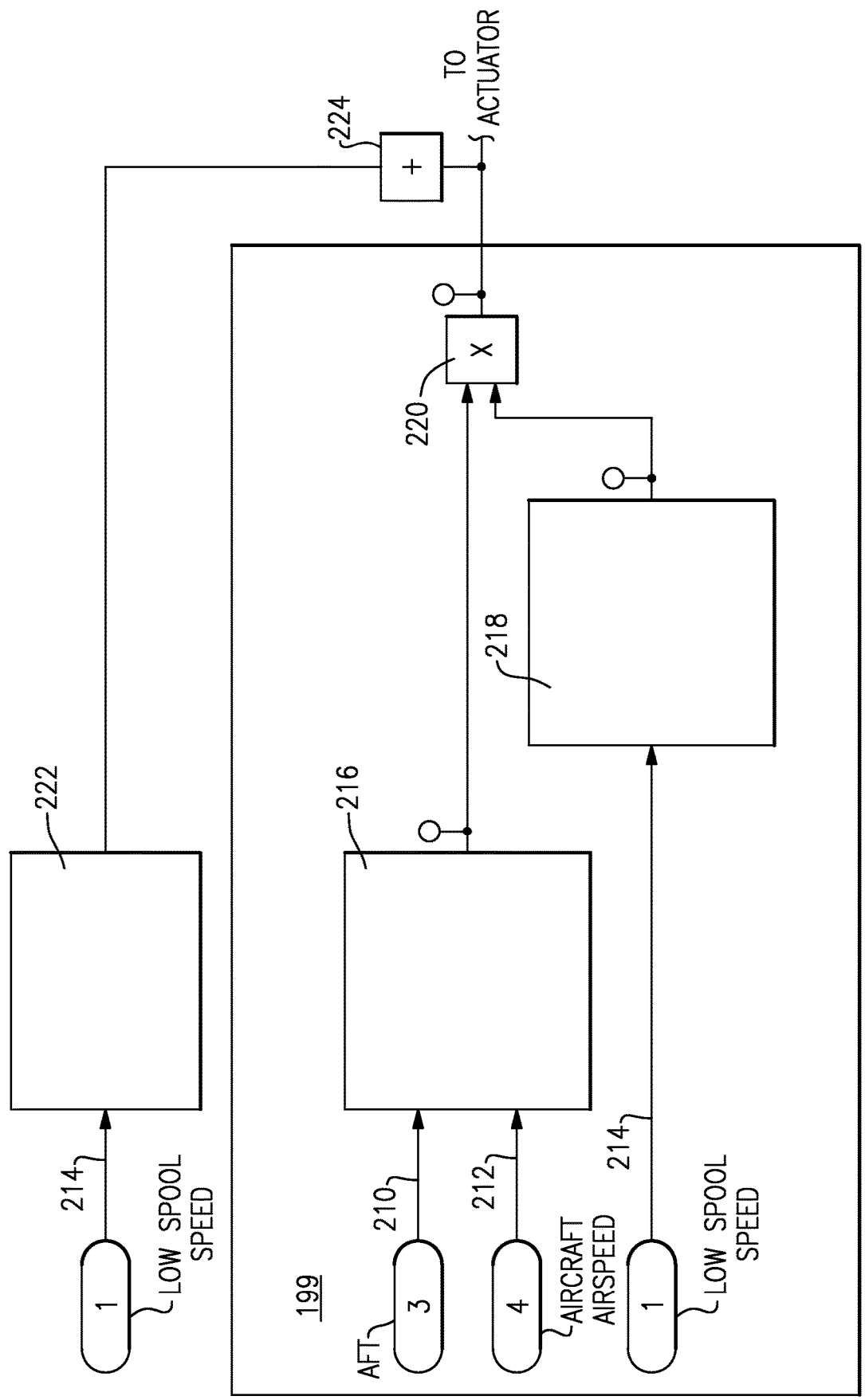
FIG. 2 is a schematic of a control logic circuit.
Figure 3:
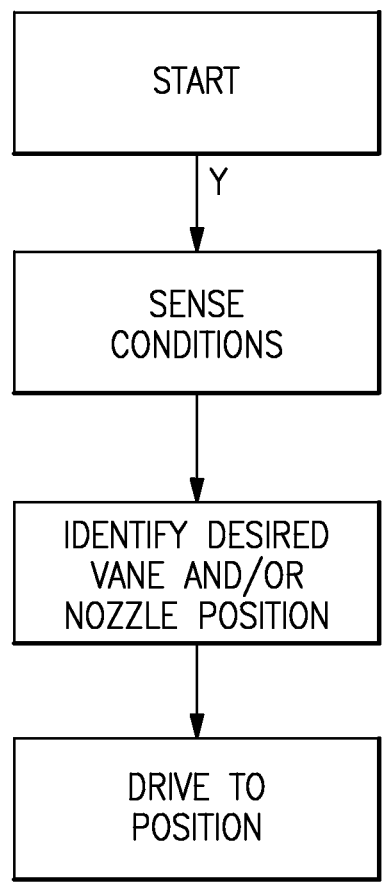
FIG. 3 is a flowchart.

Applicant has developed a control system as shown in FIG. 2 which takes in altitude signals 210, an aircraft speed signal 212, and a signal 214 which is the windmilling speed of the low spool 30.

Lookup tables are stored in control component 216, 218 and 222. Applicant has developed tables which associate particular altitudes, engine speed, and Mach number, with a desired position for the vane 184, and/or the position of the nozzle 200 to maximize the airflow as discussed above. The desired positions can be developed experimentally and will vary by aircraft and engine design. While the two features may be used in combination, it is also within the scope of this application that each could be used individually without the other, where appropriate.

The control of the area fan nozzle is disclosed in co-pending application entitled Gas Turbine Engine With Variable Area Fan Nozzle Positioned for Starting, filed on even date herewith, Ser. No. 13/367,579, and issued as U.S. Pat. No. 8,291,690.

The signal passes downstream to a block 224, wherein additional second signal comes from control elements 218 and 216. Elements 216 and 218 provide an adjustment to the output of element 222 based upon the low spool 30 speed, altitude and aircraft airspeed.

Downstream of the block 229, a signal passes to the actuators 180 and/or 204. The FIG. 2 control can be incorporated into a FADEC 199.

Of course, if the aircraft is positioned on the ground, the altitude would be generally the same, and the Mach number would be zero. Further, the low spool speed might be zero. Even so, there would be desired positions for the vane 184 and/or nozzle 200. If the aircraft is in the air when being restarted and moving at a relatively slow Mach number, it may be possible to utilize a starter 400, shown schematically, in combination with the windmilling. However, this would all be incorporated into the lookup tables stored in components 216, 218 and 222. Also, as mentioned above, at times the starter 400 cannot be relied upon in some circumstances. Again, this would be anticipated and relied upon at components 216, 218 and 222 or in the look-up table.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a compressor section;
   a low spool;
   a high spool;
   a fan section including a fan and an outer housing surrounding said fan to establish a bypass duct;
   said fan for delivering air into said compressor section, and said compressor section compressing the air and for delivering the air into a combustion section;
   said compressor section including a variable inlet guide vane which is movable between distinct angles to control airflow approaching said compressor section;
   a control programmed to position said variable inlet guide vane at startup of the gas turbine engine to direct the airflow across said compressor section; and
   a starter coupled to the low spool and the high spool such that the starter drives the low spool and the high spool in combination with windmilling in response to an aircraft associated with the gas turbine engine being in the air at an air speed that is below a speed threshold;
   said fan also for delivering bypass air into said bypass duct, said bypass duct positioned outwardly of a core engine including said compressor section; and
   wherein the position of said variable inlet guide vane is configured to direct the airflow across said compressor section while the aircraft associated with the gas turbine engine is in the air, and to increase a windmilling speed of said compressor section and turbine rotors.

2. The gas turbine engine as set forth in claim 1, comprising an actuator to change the angle of the guide variable inlet vane, said actuator being responsive to said control.

3. The gas turbine engine as set forth in claim 2, wherein said compressor section includes a first compressor and a second compressor, and the first compressor is upstream of the second compressor.

4. The gas turbine engine as set forth in claim 3, comprising a geared architecture configured to drive said fan at a lower speed than said low spool, said geared architecture being driven by said low spool.

5. The gas turbine engine as set forth in claim 1, wherein said compressor section includes a first compressor and a second compressor.

6. The gas turbine engine as set forth in claim 5, wherein variable inlet guide said vane is positioned forwardly of an upstream most rotor in the first compressor.

7. The gas turbine engine as set forth in claim 6, wherein said fan is driven with said first compressor by said low spool, and there being a gear reduction between said fan and said low spool.

8. The gas turbine engine as set forth in claim 7, wherein said control includes stored desired positions for said variable inlet guide vane to provide increased airflow into the compressor section at startup at various conditions.

9. The gas turbine engine as set forth in claim 8, wherein said various conditions include the altitude of the aircraft carrying the gas turbine engine, and the air speed of the aircraft.

10. The gas turbine engine as set forth in claim 9, wherein the various conditions also include a speed of said low spool, said low spool rotating with said first compressor when startup is occurring.

11. The gas turbine engine as set forth in claim 10, wherein said bypass duct having a variable area nozzle, and the position of the variable area nozzle also being controlled at startup to provide airflow through said bypass duct and across said fan to increase the windmilling speed.

12. The gas turbine engine as set forth in claim 11, wherein the control is programmed to cause the windmilling speed to increase at startup of the engine by adjusting the position of said variable inlet guide vane such that the airflow across said compressor section is increased.

13. The gas turbine engine as set forth in claim 12, wherein the control is programmed to cause said variable area nozzle to move to a fully open position at startup of the gas turbine engine such that the windmilling speed is increased.

* * * * *